United States Patent [19]

Fust et al.

[11] Patent Number: 4,764,034

[45] Date of Patent: Aug. 16, 1988

[54] SELF-PUMPING HYDRODYNAMIC RADIAL SLIDING BEARING

[75] Inventors: Armin Fust, Gebenstorf; Mihailo Starcevic, Mellingen, both of Switzerland

[73] Assignee: BBC Brown Boveri AG, Baden, Switzerland

[21] Appl. No.: 122,456

[22] Filed: Nov. 19, 1987

[30] Foreign Application Priority Data

Nov. 27, 1986 [CH] Switzerland .................. 4746/86

[51] Int. Cl.⁴ .................. F16C 32/06; F16C 27/02; F16N 13/20; F01D 1/36
[52] U.S. Cl. .................. 384/100; 384/99; 384/322; 184/31; 415/90
[58] Field of Search .................. 384/99, 100, 107, 114, 384/116–119, 322, 368, 397–400, 403, 404, 414; 184/31; 415/90, 89, 88

[56] References Cited

U.S. PATENT DOCUMENTS

| | | |
|---|---|---|
| 1,460,353 | 6/1923 | Williamson et al. |
| 3,733,144 | 5/1973 | Gardner .................. 415/90 |
| 4,573,810 | 3/1986 | Fust et al. .................. 384/322 |
| 4,627,746 | 12/1986 | Grisel et al. .................. 384/117 X |

FOREIGN PATENT DOCUMENTS

| | | |
|---|---|---|
| 2502805 | 7/1976 | Fed. Rep. of Germany. |
| 1354199 | 1/1964 | France. |
| 1368274 | 6/1964 | France. |
| 1270434 | 11/1986 | U.S.S.R. .................. 384/117 |

Primary Examiner—John Petrakes
Assistant Examiner—Thomas R. Hannon
Attorney, Agent, or Firm—Oblon, Fisher, Spivak, McClelland & Maier

[57] ABSTRACT

The self-pumping hydrodynamic radial sliding bearing (4) exhibits a pump block (11) arranged between two radial sliding bearing segments (13) beneath the lowest point of the generator shaft (1). The pump block (11) has, in its concave cylindrical surface facing the generator shaft (1), pump pockets (28) in the form of flat depressions into which the lubricating oil is drawn by hydrodynamic effect through ducts (25, 27) out of the lubricating oil sump (54) and forced by damming at transverse webs (30) at the end of the pump pockets (28) through further ducts (29', 29, and 22) into the lubricating oil circuit.

3 Claims, 4 Drawing Sheets

SELF-PUMPING HYDRODYNAMIC RADIAL SLIDING BEARING

FIELD OF THE INVENTION

The present invention relates to a self-pumping hydrodynamic radial sliding bearing for a shaft having a transport of a lubricating oil from an oil sump induced by the hydrodynamic effect in gaps between the shaft sliding surface and surfaces, parallel thereto, of at least one pump segment. A minor part of the lubricating oil thus transported serves to form a lubricating oil ring, and the remaining major part of the lubricating oil is pumped under pressure into a lubricating oil circuit or transported back directly into the oil pump, whilst the pump segments each exhibit in known manner one pump pocket, one pump gap supply duct through which the lubricating oil is drawn into the pump pocket, and one collecting duct, through which the lubricating oil is discharged from the pump pocket. The pump segments also have at least two radial sliding bearing segments which are arranged in a bearing support ring symmetrically to the vertical through the shaft axis and exhibit the sliding bearing surfaces for bracing the shaft.

BACKGROUND OF THE INVENTION

By virtue of their lubricating mechanism, which renders them independent of an extraneous pressurized oil source, radial sliding bearings of this construction are particularly suitable for supporting shafts with high vertical loads, where any failure of the pressurized oil supply will very quickly lead to the destruction of the bearing contact surfaces and journals. The mechanism of the lubricating effect according to the present invention ensures the formation of a hydrodynamically generated lubricating oil wedge between the sliding surfaces during the entire time when the shaft is in rotation, from the start through the steady service state to stoppage. Seizing of the bearing and the shaft, such as can occur in the case of a brief failure of a pressurized oil supply, is therefore virtually excluded.

Known radial sliding bearings have loose lubricating rings, or rings connected firmly to the shaft or integral with the latter, to transport the lubricating oil from the lubricating oil sump to the points where the lubricating oil wedge is required to be formed. They dip into the lubricating oil sump, the level of which is placed below the outlet aperture for the shaft from the bearing housing in order to prevent lubricating oil losses, and entrain the oil upwards, after which the oil passes into the bearing gaps.

However, the field of application of such bearing constructions is restricted to cases where the heating of the oil is not so great that an oil cooler is required, or at worst an oil cooler in the sump is sufficient, but the cooling action of such oil coolers is generally deficient. This means that the means referred to for the self-transport of the lubricating oil to the bearing points are only satisfactory up to certain shaft diameters and circumferential speeds of the journal, for which the oil heating the oil foam formation remain within admissible limits. This is generally the case for shaft diameters below 600 mm and journal circumference speeds up to a maximum of 20 m/s.

More heavily loaded horizontal sliding bearings would run inadmissibly hot without oil coolers provided outside the housing. Such bearings are customarily equipped with a pump to circulate the lubricating oil through the bearing and the oil cooler or coolers. In order to prevent bearing damage, these elements (that is to say the pumps and coolers) must have backups (that is to say, they must be present at least in duplicate). Self-contained operation of such highly loaded bearings, without extraneous energy sources, is therefore impossible.

The problem outlined above also represents a considerable factor for highly axially loaded end-thrust sliding bearings of hydroelectric generators, for example. In this case if the bearing ran hot due to a failure of the lubricating oil pump, this would involve not only high repair costs, but also the failure of the power supply for a long time, with significant consequent economic losses.

The problem has been solved for such axial sliding bearings by a self-pumping hydrodynamic plain bearing proposed in Swiss Pat. No. 651,362 (namely for the guide bearing of an end-thrust sliding bearing). The guide bearing absorbs the horizontal forces acting upon the journal, and like the axial bearing itself, the journal is composed of individual segments. The oil-transporting elements of this guide bearing consist of recesses in the entry regions of the segments, as viewed in the direction of the shaft circumferential speed. These recesses extend with constant radial depth over a part of their length and taper in wedge shape after a step in the final part in the running direction, whereby the oil is drawn into the lubricating gap there and forms the hydrodynamic lubricating film in the remaining part of the running surface of the bearing segment. Because more oil is entrained out of the oil sump by the shaft due to the viscosity in the initial deeper part of the recess than is necessary to form the lubricating film and can be absorbed by the lubricating film gap, a lubricant discharge duct is provided extending transversely to the running direction in front of the said step. The excess lubricant stream is discharged through the lubricant discharge duct back into the oil sump under pressure which has built up in front of the wedge-shaped taper, or else, if larger quantities of heat have to be dissipated, the excess lubricant stream is forced through an external cooler and transported back into the sump. This part of the lubricant stream constitutes the transport quantity circulated by the viscosity; the far smaller residue is squeezed through the lubricating film gap and leaves the latter heated at the end of the bearing segment. The circulation of the lubricant on this principle is therefore independent on any pump devices and therefore satisfies the initial desideratum of absolute reliability of the oil supply and oil cooling.

However, the principle of the above-described form is not suitable for radial sliding bearings with a horizontal position of the shaft. On the contrary, it requires certain modifications for this purpose, which form the object of the present invention.

SUMMARY OF THE INVENTION

In the hydrodynamic radial sliding bearing according to the invention, the pump segments are provided in a pump block which is mounted on resiliently yielding bracing elements on the underside of the shaft between two radial sliding bearing segments arranged on either side of the vertical through the shaft axis.

In an advantageous form of construction of such a radial sliding bearing, bracing elements for the pump block are provided which press the pump block against the shaft through hydraulic power amplifiers subject to the lubricating oil pressure with a force proportional to the lubricating oil pressure.

BRIEF DESCRIPTION OF THE DRAWINGS

The invention is explained in further detail below with reference to an exemplary embodiment illustrated in the drawings, wherein.

DETAILED DESCRIPTION OF THE PRESENTLY PREFERRED EMBODIMENT

Figure 1:
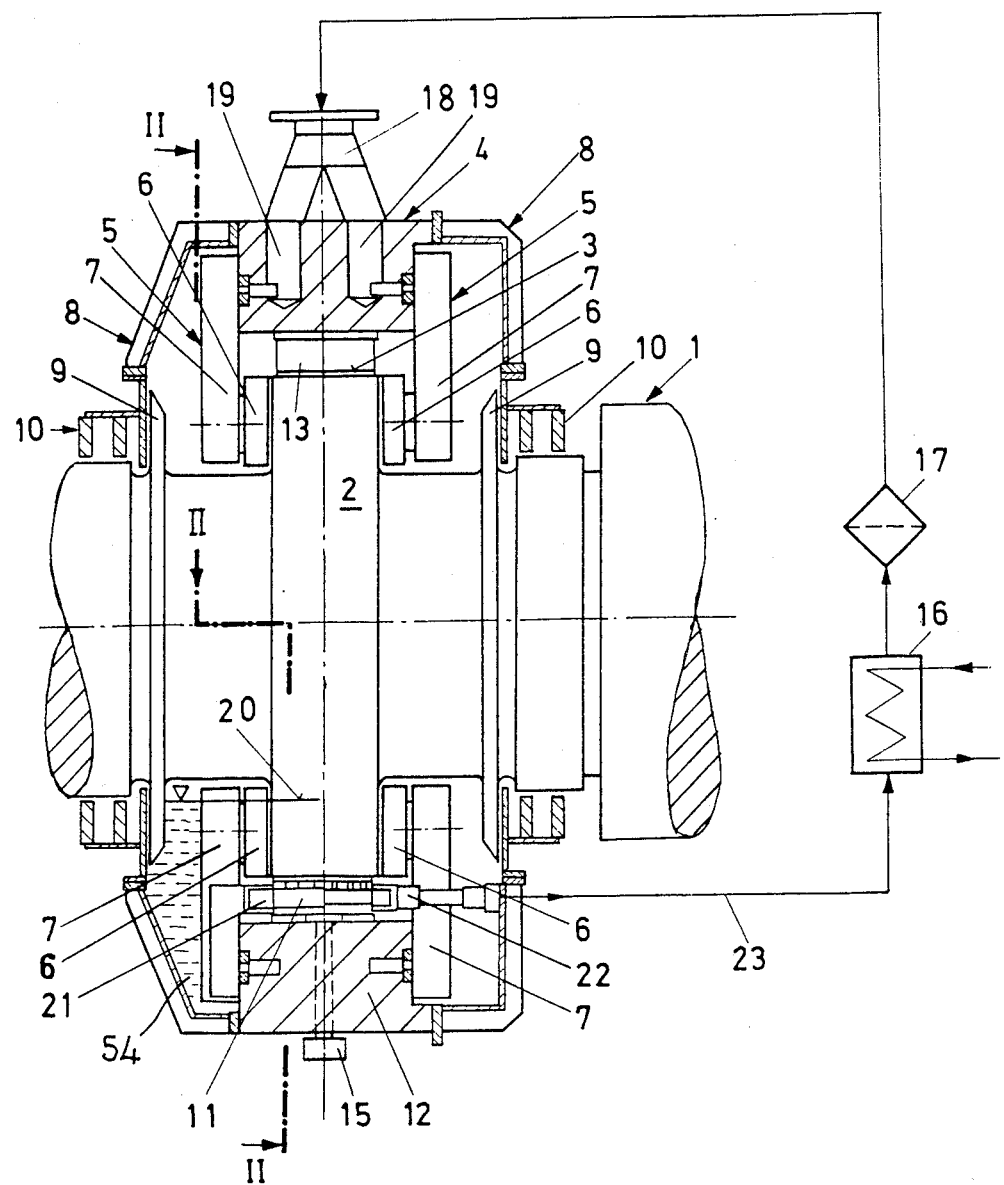
FIG. 1 shows a longitudinal section through a radial sliding bearing combined with two axial thrust bearings as a generator bearing of a pipe turbine.
Figure 2:
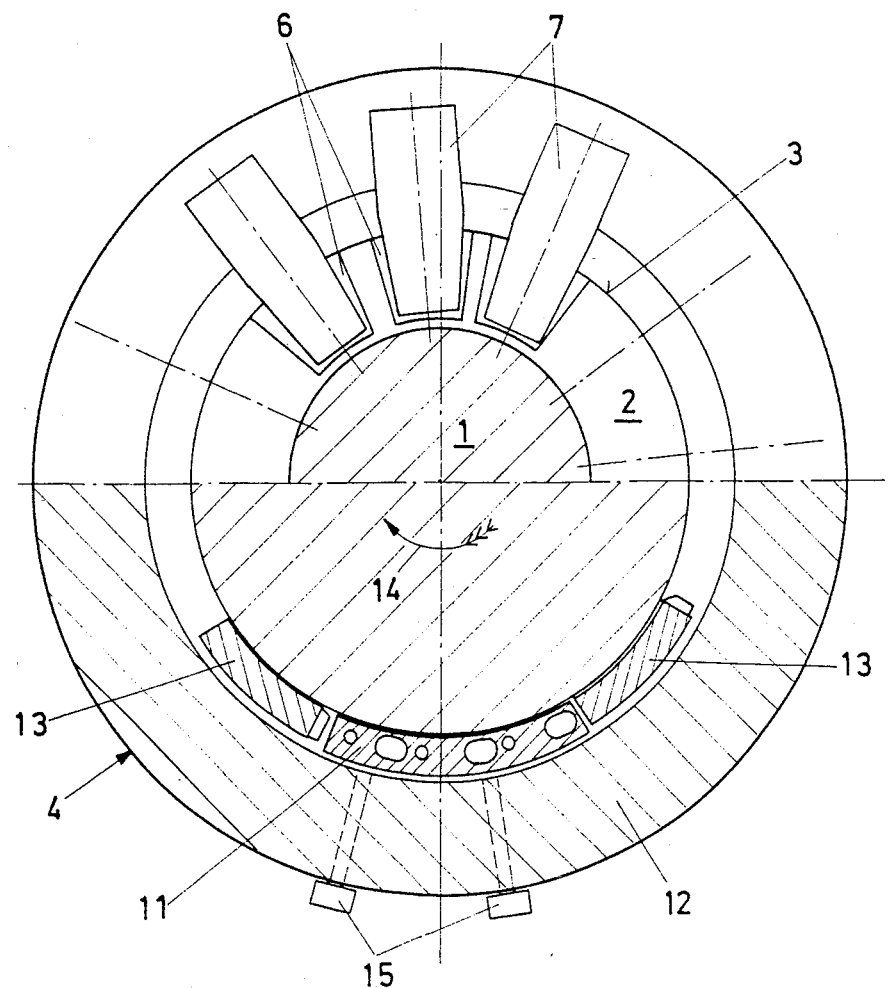
FIG. 2 shows a cross-section along the line II—II marked in FIG. 1.

A generator shaft 1 which can be seen in FIGS. 1 and 2 exhibits a shaft collar 2 the circular cylindrical circumference of which forms a shaft sliding surface 3. The shaft sliding surface 3 is accommodated by a radial sliding bearing 4, and the circular lateral surfaces of the shaft collar 2 serve as sliding surfaces for two axial sliding bearings 5. The axial sliding bearings 5 exhibit a number of axial bearing segments 6 distributed uniformly round the circumference of the shaft collar 2, are braced tiltably on axial segment bracing beams 7 in known manner, and fix the generator shaft 1 in its longitudinal direction. The radial sliding bearing 4 and the two axial sliding bearings 5 are enclosed by two bearing housing halves 8, and the generator shaft 1 is provided at its passages out of the bearing housing halves 8 with slinger discs 9 which, in cooperation with labyrinths 10, prevent the emergence of lubricating oil from the bearing housing.

Departing from the self-pumping hydrodynamic axial bearing disclosed in Swiss Pat. No. 651,362, in which the elements to generate both the pumping effect and the lubricating film in the bearing segments are present actually in the bearing segments, in the present sliding bearing the bearing and lubricating oil pumping functions are separate.

The lubricating oil pumping function is served by a particular pump block 11 which is mounted at the lowest point of a bearing support ring 12, and on each of the two sides of which a bearing segment 13 is provided. The bearing segments 13 are, as is not shown in detail in FIG. 2, mounted tiltably in the bearing support ring 12 in known manner, so that for a rotating shaft, the direction of rotation of which is indicated by a directional arrow 14 in FIG. 2, a load-bearing hydrodynamically formed lubricating film wedge is built up between the sliding surfaces of the generator shaft 1 and of the bearing segments 6 by the lubricating oil entrained out of an oil sump 54 by the generator shaft 1.

FIG. 2 shows two bearing segments 13, which are sufficient for a statically determined bracing of the shaft. However, as a precaution against lifting off, a further bearing segment 13 may also be provided at the highest point of the shaft, as shown in FIG. 1.

Contact pressure devices 15, the construction of which is described more fully below, press the pump block 11 against the generator shaft 1. The pumping effect of the pump block 11 is so intense that the oil is forced through a lubricating oil cooler 16, a lubricating oil filter 17, and a pipe branch 18 into the bearing support ring 12, where it passes through distributor ducts 19 into the axial segment bracing beams 7 and through further ducts, not shown, to the individual axial bearing segments 6. The axial bearing segments 6 exhibit bores through which the oil flows into the oil supply pockets in front of the lubrication gaps.

The oil sump 54 has a level 20. The pump block 11, which is located in the oil sump 54, draws the oil out of the housing bottom through an intake breather 21, so that only calmed air-free oil enters the circuit. The oil transported out of the pump block 11 into the circuit is combined in a collecting duct 22, after which it flows through a lubricating oil pipe 23 to the lubricating oil cooler 16.

Figure 4:
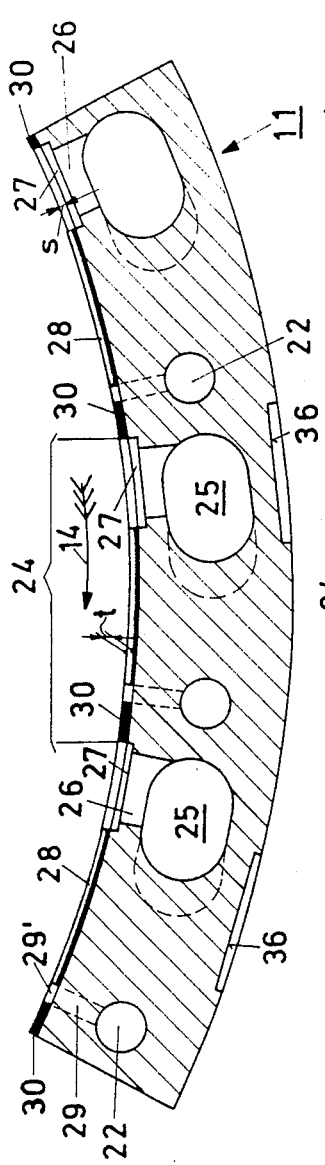
FIGS. 3 and 4 show a sliding bearing segment in plan and in a cross-section along the line of section IV—IV of FIG. 3 respectively.
Figure 3:
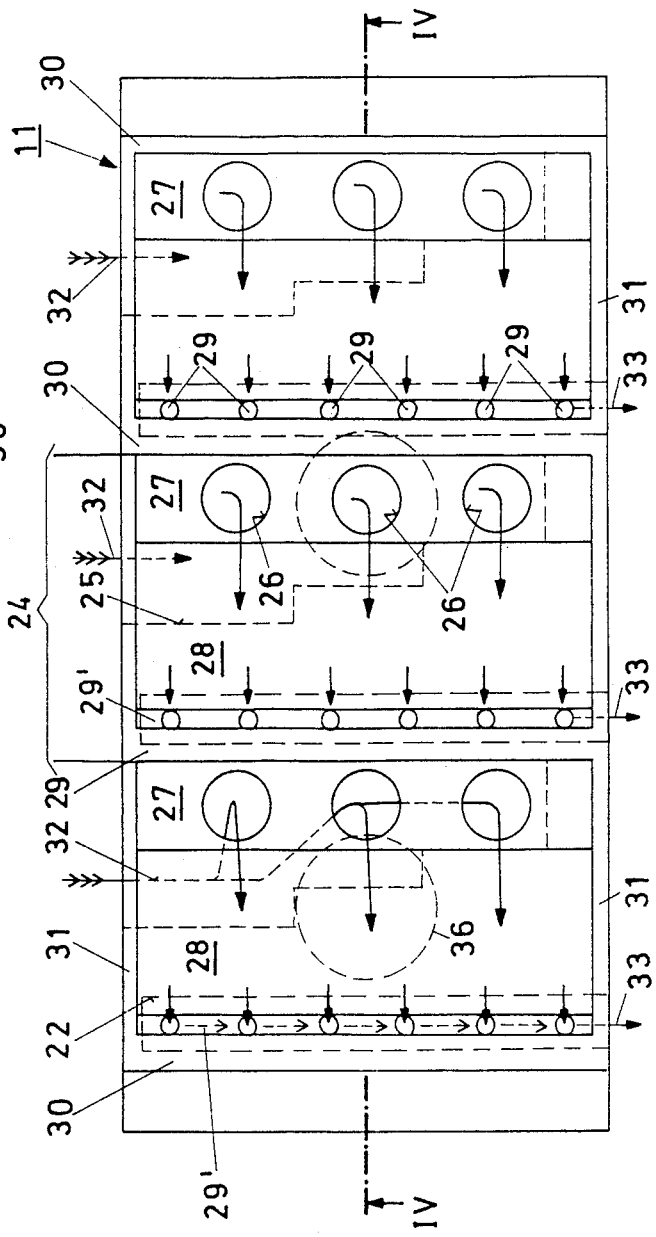

The pump block 11 is illustrated in plan in FIG. 3 and in section in FIG. 4 along the line of section IV—IV marked in FIG. 3.

The pump block 11 exhibits three pump segments 24. Each of the pump segments 24 exhibits a pump gap supply duct 25, three intake ducts 26, a distributor duct 27 of depth s extending through the three intake ducts 26, a pump pocket 28 of radial depth t, and a collecting channel 29' with a row of discharge ducts 29. The discharge ducts 29 lead into the collecting ducts 22, from which the oil is forced through the lubricating oil pipe 23 (see FIG. 1) into the circuit. The pump pockets 28 are delimited by transverse webs 30 and lateral webs 31, which largely prevent any escape of the lubricant out of the pump pockets 28. The pump gap supply duct 25 is open on only one side i.e., on a side designated by the flow arrow 32. After the third intake duct 26, as viewed in the inflow direction of the oil, the pump gap supply duct 25 is closed, the cross-section of the pump gap supply also tapers abruptly in the inflow direction of the oil in order to maintain approximately the condition of continuity for the flow after the first and second intake ducts 26, which is indicated by the stair-shaped dashline in FIG. 3.

The oil flowing out of the oil sump through the abovementioned intake breather 21 into the pump gap supply duct 25 on the inflow side of a pump segment of the pump block 11 is drawn up through the intake ducts 26 and the distributor duct 27 into the pump pocket 28 and entrained by the shaft running surface along the length of the pump pocket 28. Due to the constriction of the gap between the generator shaft 1 and the transverse web 30, only a small part of the oil is entrained farther by the generator shaft 1, whereas the major part is forced by the accumulation through the collecting channel 29' into the discharge ducts 29 and from there, as indicated by flow arrows 33 in FIG. 3, through the collecting duct 22 into the lubricating oil circuit.

Figure 5:
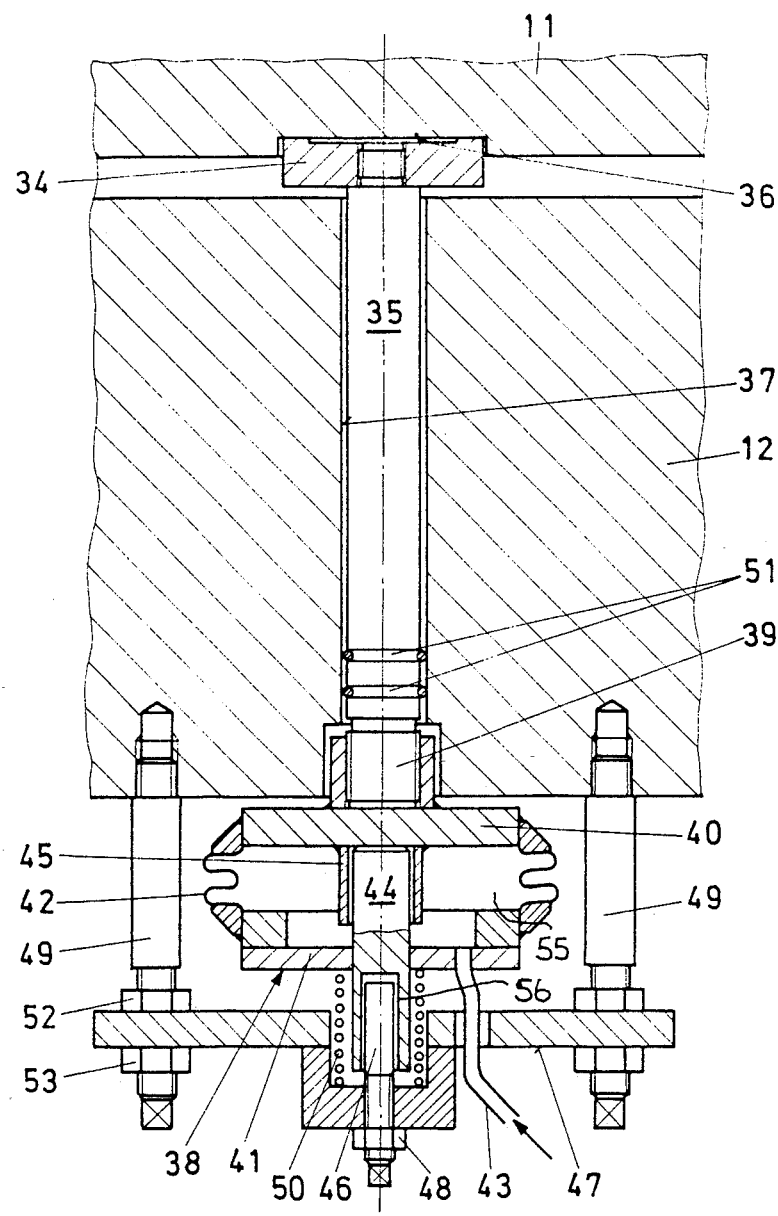
FIG. 5 shows a contact pressure device for the pump block of the bearing.

FIG. 5 shows the construction of a contact pressure device 15 for the pump block 11 in a sectional view. The pump block 11 is braced through bracing plates 34 upon a bracing rod 35. In the case of the pump block 11 illustrated in FIGS. 3 and 4, two bracing points are provided, where the bracing plates 34 engage into depressions 36. The bracing rod 35 extends through a bore 37 downwards into a hydraulic power amplifier 38, in the top part of which it is secured by a screwthread 39. The hydraulic power amplifier 38 exhibits an upper plate 40 and a lower plate 41, which are mutually flexibly connected by a corrugated tube 42 and thus form a closed chamber 55 which communicates conductively with the lubricating oil circuit through an oil pressure pipe 43.

A pin 44 connected to the lower plate 41 engages by its upper end into a sleeve 45 connected to the upper plate 40 and thus centers the two plates 40 and 41 mutually. The lower end of the pin 44 exhibits a longitudinal bore 56, which is engaged by a centering pin 46. The centering pin 46 guides the lower plate 41 and simultaneously acts as a stop for the lower plate 41. It is screwed into a bracing plate 47 and secured by means of a nut 48. The bracing plate 47 is secured by stay bolts 49 to the bearing support ring 12 and accommodates in its center a helicoidal spring 50 which is clamped between the bracing plate 47 and the lower plate 41. The position and distance of the bracing plate 47 relative to the bearing support ring 12, and hence also the pre-tension of the helicoidal spring 50, can be adjusted by two nuts 52, 53 on the stay bolts 49. Two loop-rings 51 on the bracing rod 35 seal the oil sump 54 from the exterior.

In service the pump pressure of the oil circuit, which acts through the oil pressure pipe 43 in the hydraulic power amplifier 38, presses the pump block 11 against the generator shaft 1 with a force proportional to the pump pressure.

At standstill, the helicoidal spring 50 ensures that the pump block 11 is retained on the generator shaft 1 by bringing the top end of the pin 44 into abutment against the upper plate 40 and thereby also raising the bracing rod 35.

LIST OF SYMBOLS

| | | | |
|---|---|---|---|
| 1 | Generator shaft | 29 | Discharge ducts |
| 2 | Shaft collar | 29' | Collecting channels |
| 3 | Shaft sliding surface | 30 | Transverse webs |
| 4 | Radical sliding bearing | 31 | Lateral webs |
| 5 | Axial sliding bearing | 32 | Flow arrows |
| 6 | Axial bearing segments | 33 | Flow arrows |
| 7 | Axial segment bracing beams | 34 | Bracing plates |
| 8 | Bearing housing halves | 35 | Bracing rods |
| 9 | Slinger discs | 36 | Depressions |
| 10 | Labyrinthes | 37 | Bore |
| 11 | Pump block | 38 | Hydraulic power amplifier |
| 12 | Bearing support ring | | |
| 13 | Radical sliding bearing segments | 39 | Screwthread |
| | | 40 | Upper plate |
| 14 | Arrow indicating direction of rotation | 41 | Lower plate |
| | | 42 | Corrugated tube |
| 15 | Contact pressure devices | 43 | Oil pressure pipe |
| 16 | Lubricating oil cooler | 44 | Pin |
| 17 | Lubricating oil filter | 45 | Sleeve |
| 18 | Pipe branch | 46 | Centering pin |
| 19 | Distributor ducts | 47 | Bracing plate |
| 20 | Oil level | 48 | Nut |
| 21 | Intake breather | 49 | Stay bolt |
| 22 | Collecting duct | 50 | Helicoidal spring |
| 23 | Lubricating oil pipe | 51 | Loop-rings |
| 24 | Pump segments | 52 | Nut |
| 25 | Pump gas supply duct | 53 | Nut |
| 26 | Intake ducts | s | Depth of the distributor ducts 27 |
| 27 | Distributor ducts | | |
| 28 | Pump pockets | t | Radial depth of the pump pockets |

What is claimed is:

1. A self-pumping hydrodynamic radial sliding bearing (4) for a shaft (1), having a transport of a lubricating oil from an oil sump (54) induced by the hydrodynamic effect in gaps between the shaft sliding surface (3) and surfaces, parallel thereto, of at least one pump segment (24), a minor part of the lubricating oil thus transported serving to form a lubricating oil ring and the remaining major part of the lubricating oil being pumped under pressure into a lubricating oil circuit (23, 16, 17) or transported back directly into the oil sump (54), whilst the at least one pump segment (24) exhibits one pump pocket (28), one pump gap supply duct (25) through which the lubricating oil is drawn into the pump pocket (28), and one collecting duct (22) through which the lubricating oil is discharged from the pump pocket (28), also having at least two radial sliding bearing segments (13) which are arranged in a bearing support ring (12) symmetrically to the vertical through the shaft axis and exhibit the sliding bearing surfaces for bracing the shaft (1), wherein the at least one pump segment (24) is provided in a pump block (11) which is mounted on resiliently yielding bracing elements (34 to 51) on the underside of the shaft (1) between two radial sliding bearing segments (13) arranged on either side of the vertical through the shaft axis.

2. The radial sliding bearing as claimed in claim 1, wherein the pump block (11) exhibits the form of an annular sector of a circle and is provided with three pump segments, the pump pockets (28) of which communicate at their start, as viewed in the direction of rotation (14) of the shaft (1), with a distributor duct (27) and at their end with a collecting channel (29'), whilst the same extend parallel to the shaft (1) and the pump segments (24) are delimited with respect to the adjacent pump segments and to the oil pump (54) respectively by transverse webs (30) parallel to the shaft (1) and by lateral webs (31) at the rounded edges of the pump block (11), whilst also the depth (s) of the distributor ducts (27) exceeds the depth (t) of the pump pockets (28), also the pump gap supply ducts (25) communicate through intake breathers (21) with the oil sump (54), the pump gap supply ducts (25) exhibit stepped cross-sections in their flow direction and each of these cross-sections communicates through an intake duct (26) with the distributor ducts (26), and the collecting channels (29') are connected by discharge ducts (29) to the collecting ducts (22).

3. The radial sliding bearing as claimed in claim 1, wherein two bracing elements mutually offset in its circumferential direction are provided for the mounting of the pump block (11) and each exhibit the following parts:

a bracing rod (35) which extends from outside the bearing support ring (12) through a radial bore (37) in the latter to the outer cylindrical surface of the pump block (11) and engages through an interposed bracing plate (34) into a circular countersink (36) on the pump block (11);

a hydraulic power amplifier (38) with an upper plate (40) and a lower plate (41), the circumferences of which are mutually connected by a corrugated tube (42) and delimit a closed chamber (55) therewith;

an oil pressure pipe (43) which connects the lubricating oil circuit (23, 16, 17) to the chamber (55) enclosed by the two plates (40, 41) and the corrugated tube (42);

a screwthreaded sleeve attached rigidly to the outside of the upper plate (40), into which the bracing rod (35) is screwed by a screwthread (39);

a sleeve (45) connected rigidly to the inside of the upper plate (40);

a pin (44) which penetrates the lower plate (41) centrally and is rigidly connected thereto, whilst the sleeve (45) forms a guide means for that part of the pin (44) which projects into the interior of the chamber (55) enclosed by the plates (40, 41) and the corrugated tube (42), whereas the outwardly projecting part of the pin (44) exhibits a longitudinal bore (56);

a bracing plate (47) which is attached by two nuts (52, 53) for each to two stay bolts (49) screwed into the bearing support ring (12), which permit an adjustment of the position of the bracing plate (47) relative to the bearing support ring (12), which bracing plate (47) exhibits a central depression for the accommodation of a helicoidal spring (50) which is clamped between the bottom of this central depression and the outside of the lower plate (41), and a central screwthreaded bore to accommodate a centering pin (46) which engages into the longitudinal bore (56) of the pin (44) and is tensioned relative to the bracing plate (47) by a nut (48); and loop-rings (51) on the bracing rod (35) to seal the bore (37) in the bearing support ring (12).

* * * * *